United States Patent
Alappat et al.

(10) Patent No.: US 8,819,369 B1
(45) Date of Patent: Aug. 26, 2014

(54) RESTORING A VIRTUAL MACHINE

(75) Inventors: Antony Jayaraj Alappat, San Jose, CA (US); Pratik Murali, Sunnyvale, CA (US); Navleen K. Jaggi, Campbell, CA (US)

(73) Assignee: NetApp, Inc., Sunnyvale, CA (US)

( * ) Notice: Subject to any disclaimer, the term of this patent is extended or adjusted under 35 U.S.C. 154(b) by 255 days.

(21) Appl. No.: 13/533,138

(22) Filed: Jun. 26, 2012

(51) Int. Cl.
*G06F 12/00* (2006.01)
*G06F 13/00* (2006.01)
*G06F 13/28* (2006.01)
*G06F 17/30* (2006.01)
*G06F 11/14* (2006.01)
*G06F 9/50* (2006.01)
*G06F 9/455* (2006.01)

(52) U.S. Cl.
CPC ........ G06F 17/30088 (2013.01); *G06F 9/5077* (2013.01); *G06F 9/45558* (2013.01); *G06F 11/1469* (2013.01)
USPC ............... 711/162; 718/1; 718/104; 707/640; 707/641; 707/649; 711/161

(58) Field of Classification Search
CPC . G06F 9/45558; G06F 9/5077; G06F 9/5088; G06F 11/1469; G06F 17/30088
USPC ........... 718/1, 104; 711/6, 162, 161; 707/634, 707/640, 641, 649
See application file for complete search history.

(56) References Cited

U.S. PATENT DOCUMENTS

| | | | |
|---|---|---|---|
| 2010/0049750 A1* | 2/2010 | Srivastava et al. | 707/202 |
| 2012/0151480 A1* | 6/2012 | Diehl et al. | 718/1 |
| 2013/0262638 A1* | 10/2013 | Kumarasamy et al. | 709/221 |

OTHER PUBLICATIONS

"VMware vSphere", Retrieved Date: Apr. 9, 2012, pp. 1-2, http://www.vmware.com/products/vmotion/overview.html.
"VDH (file format)", Retrieved Date: Apr. 20, 2012, pp. 1-5, http://en.wikipedia.org/wiki/VHD_%28file_format%29.
Kashyap, Varun, "Create A Virtual Machine Clone of Your Existing Hard Drive [Windows]", Oct. 12, 2009, pp. 1-3, http://www.makeuseof.com/tag/create-a-virtual-machine-image-of-your-existing-hard-drive-windows/.

* cited by examiner

*Primary Examiner* — Sanjiv Shah
*Assistant Examiner* — Shane Woolwine
(74) *Attorney, Agent, or Firm* — Cooper Legal Group, LLC

(57) ABSTRACT

One or more techniques and/or systems are provided for restoring an original virtual machine from a snapshot according to a current virtual machine layout different than an original virtual machine layout, where the original virtual machine layout is specified within the snapshot. That is, a snapshot of an original virtual machine stored within one or more original datastores according to an original virtual machine layout may be created. Over time, as changes occur to the virtual machine, the original virtual machine may be stored as a current virtual machine according to a current virtual machine layout. To effect the restoration, a cloned datastore comprising replicas of the original datastores may be created from the snapshot, and a cloned virtual machine and one or more cloned virtual machine disks (from the cloned datastore) may be migrated to one or more current datastores according to the current virtual machine layout.

20 Claims, 11 Drawing Sheets

RESTORING A VIRTUAL MACHINE

FIELD

The instant disclosure pertains to restoring a virtual machine from a snapshot according to a new virtual machine layout.

BACKGROUND

Virtual machines allow many computing environments (e.g., general desktop environments, database servers, web services, etc.) to be implemented within one or more host computing devices. A virtual machine may comprise its own operating system, applications, and configurations. As such, a virtual machine may function as a self-contained computing environment (even though it is virtual rather than physical). Moreover, one or more virtual machines may be hosted on a single host computing device, such as a desktop, laptop, server, storage controller, etc. For example, a virtual machine may be hosted (e.g., virtualized by a hypervisor, such as a virtual machine management console) using virtual machine data (e.g., virtual machine configuration data and/or one or more virtual machine disks). The virtual machine data may be stored according to a virtual machine layout. For example, virtual machine configuration data of a virtual machine may be stored within a first datastore, such as a first folder, and a virtual machine disk of the virtual machine may be stored within a second datastore, such as a second folder. It may be appreciated that a datastore may comprise or rather be comprised within a folder, a volume, a LUN, a storage device accessible through a storage controller, and/or other storage locations. In this way, a virtual machine may be stored within one or more storage locations according to a virtual machine layout (e.g., a virtual machine layout for the virtual machine may specify that configuration data of the virtual machine is stored within a first datastore and that a virtual machine disk of the virtual machine is stored within the second datastore).

A virtual machine management console may be configured to perform various management functions associated with virtualized data, such as virtual machines. In one example, the virtual machine management console may create a snapshot of a virtual machine, which may comprise a layout of the virtual machine at a particular point in time. For example, the snapshot may comprise a point in time representation of a first datastore that comprises virtual machine configuration data of a virtual machine, a second datastore (at that point in time) that comprises a first virtual machine disk of the virtual machine, and a third datastore (at that point in time) that comprises a second virtual machine disk of the virtual machine. The snapshot may thus identify or correspond to an original virtual machine layout that was in existence when the snapshot was created.

The snapshot may be used to restore the virtual machine, such as creating a clone of the virtual machine (e.g., a virus may have infected a virtual machine, and thus a user may desire to destroy the infected virtual machine and create a clone of the non-infected virtual machine from the snapshot). Unfortunately, restoration of the virtual machine may be limited to the original virtual machine layout identified within the snapshot (e.g., the virtual machine may be merely restored to the one or more original datastores that comprised the virtual machine when the snapshot was created). That is, current restoration techniques may be unable to restore the virtual machine according to a current virtual machine layout that is different than the original virtual machine layout. For example, the snapshot may have been created when a first datastore comprised virtual machine configuration data, a second datastore comprised the first virtual machine disk, and a third datastore comprised the second virtual machine disk, which may have been captured as the original virtual machine layout within the snapshot. Over time, however, the original virtual machine layout may have been modified to a current virtual machine layout (e.g., the third datastore, such as a storage device, comprising the second virtual machine disk may have failed, thus resulting in an administrator consolidating the second virtual machine disk to the second datastore already comprising the first virtual machine disk, such that the second datastore comprises both the first and second virtual machine disks in the current virtual machine layout (instead of merely the first virtual machine disk as in the original virtual machine layout)). Current restoration techniques may be unable to restore the virtual machine from the snapshot according to the current virtual machine layout because the current virtual machine layout is different than the original virtual machine layout specified within the snapshot (e.g., the second virtual machine disk now resides within the second datastore according to the current virtual machine layout, as opposed to residing within the third datastore according to the original virtual machine layout).

SUMMARY

The disclosure relates to one or more techniques and/or systems for restoring an original virtual machine from a snapshot according to a current virtual machine layout different than an original virtual machine layout of the original virtual machine, where the original virtual machine layout is specified within the snapshot. That is, a snapshot of an original virtual machine may have been created when the original virtual machine was stored within one or more original datastores according to an original virtual machine layout. For example, the snapshot may comprise a storage snapshot of the one or more original datastores that comprised the original virtual machine (e.g., an original datastore (A) comprising virtual machine configuration data, an original datastore (B) comprising virtual machine disk (1), and an original datastore (C) comprising virtual machine disk (2)). It may be appreciated that one example of a snapshot 406 associated with an original virtual machine layout 402 is illustrated in FIG. 4. After the snapshot was created, the original virtual machine may be stored according to a current virtual machine layout as a current virtual machine. For example, a storage device comprising one or more of the original datastores may have failed. Responsive to the failure, an administrator may have migrated the virtual machine configuration data from the original datastore (A) to a current datastore (X), the virtual machine disk (1) from the original datastore (B) to a current datastore (Y), and the virtual machine disk (2) from the original datastore (C) to the current datastore (Y) as the current virtual machine layout, for example. It may be appreciated that one example of a current virtual machine 510 stored according to a current virtual machine layout 506 is illustrated in FIG. 5.

The original virtual machine may be restored from the snapshot according to the current virtual machine layout. That is, a clone of the original virtual machine may be created from the snapshot. For example, a user may desire to destroy a current virtual machine (e.g., the user may have accidently deleted a document, discovered a virus, etc.), and restore a clone of a prior version of the current virtual machine, such as the original virtual machine (e.g., the original virtual machine may comprise (an original copy of) a document that was inadvertently deleted). Accordingly, the current virtual machine layout of the current virtual machine may be captured (e.g., a virtual machine management console may be queried with a current ID for the current virtual machine to retrieve the current virtual machine layout). The current virtual machine layout may identify one or more current datastores as comprising virtual machine configuration data for the current virtual machine and/or one or more current datastores as comprising virtual machine disk data for the current virtual machine. The current virtual machine layout may be compared with the original virtual machine layout of the original virtual machine. For example, the current ID of the current virtual machine may be compared with an original ID of the original virtual machine. In one example, the original virtual machine layout and/or the original ID may be specified within the snapshot.

Responsive to the current virtual machine layout being different than the original virtual machine layout, one or more current virtual machine disks (e.g., a virtual hard disk (.VHD) file used by the current virtual machine to store a guest operating system, applications, and/or files of the current virtual machine) of the current virtual machine may be removed. For example, the one or more current virtual machine disks may be detached and destroyed. It may be appreciated that one example of a current virtual machine layout 506 after removal 604 of one or more current virtual machine disks is illustrated in FIG. 6. It may be appreciated that although disk and/or the like may be referred to herein, the instant application including the scope of the claims is not meant to be limited to a narrow interpretation of the same. That is, disk and/or the like may be thought of generally as one or more storage devices, rather than a particular type of (floppy or other) disk(s).

A cloned datastore (e.g., one or more cloned replica datastores representing the one or more original datastores that comprised the original virtual machine when the snapshot was created) may be created from the snapshot. The cloned datastore may comprise a cloned virtual machine (e.g., virtual machine configuration data) and/or one or more cloned virtual machine disks corresponding to the original virtual machine. In one example, the cloned datastore may be mounted to a hypervisor, such as an ESX server (e.g., a hypervisor hosting the virtual machine management console). It may be appreciated that one example of a cloned datastore 706 is illustrated in FIG. 7. In one example, the current virtual machine may be unregistered from the virtual machine management console, and the cloned virtual machine may be registered with the virtual machine management console. It may be appreciated that one example of virtual machine registration is illustrate in FIG. 8. The cloned virtual machine may be migrated from the cloned datastore to the one or more current datastores according to the current virtual machine layout. It may be appreciated that one example of migrating 910 a cloned virtual machine 714 is illustrated in FIG. 9. In one example, the one or more cloned virtual machine disks may be detached, but not destroyed, from the cloned virtual machine, and then the cloned virtual machine may be migrated. It may be appreciated that one example of detaching 914 and 916 one or more cloned virtual machine disks is illustrated in FIG. 9.

The one or more cloned virtual machine disks may be migrated from the cloned datastore to the one or more current datastores according to the current virtual machine layout. It may be appreciated that one example of migrating 1008 one or more cloned virtual machine disks is illustrated in FIG. 10. In one example, the one or more cloned virtual machine disks may be attached to the cloned virtual machine that was migrated to the one or more current datastores. In another example, the cloned datastore may be destroyed after the migration. In this way, the original virtual machine may be restored as the cloned virtual machine, and may be stored according to the current virtual machine layout (instead of the original virtual machine layout).

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
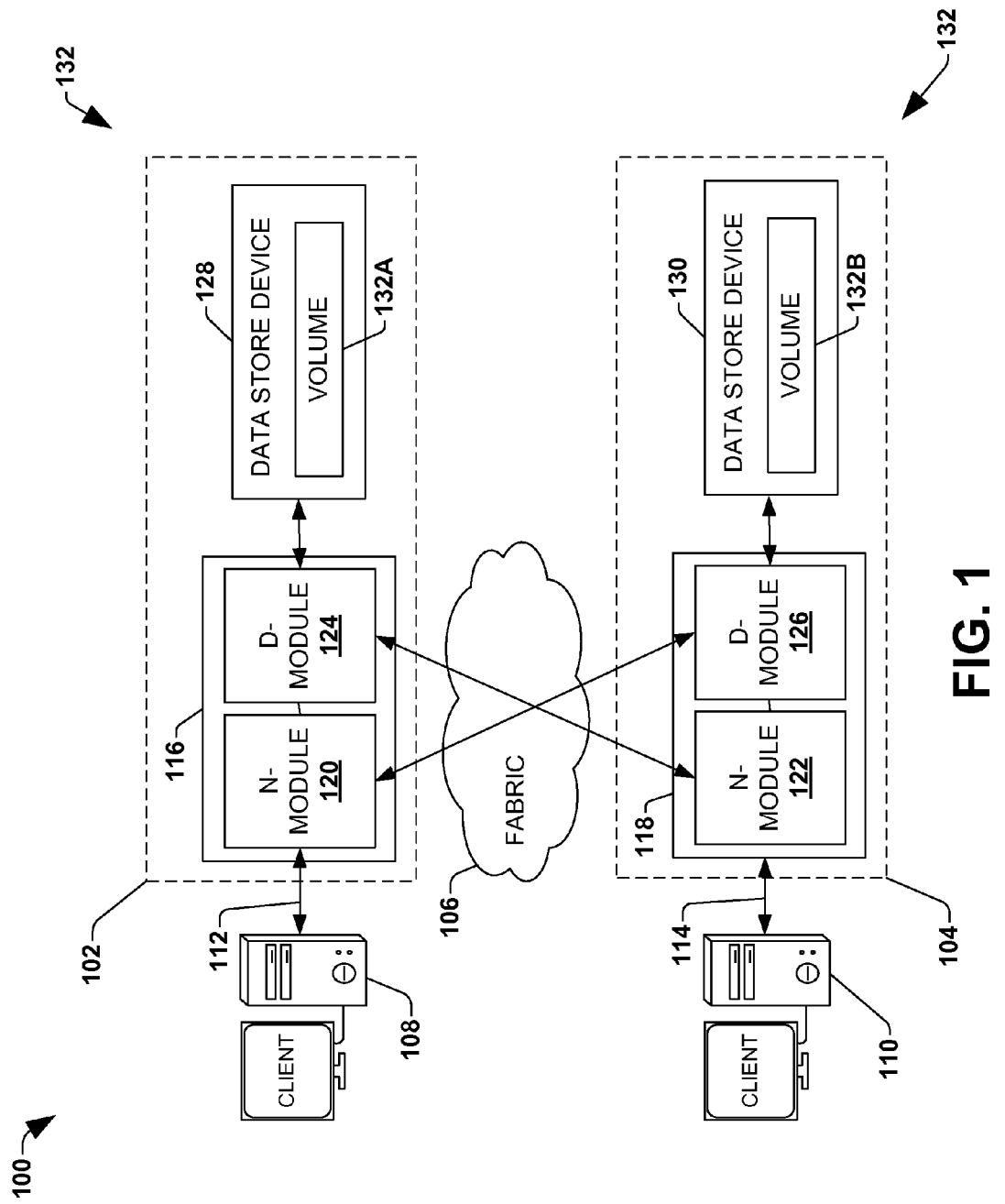
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. Nothing in this detailed description is admitted as prior art.

Computing environments, such as a desktop and/or server environment, may be implemented within virtual machines. In particular, a virtual machine may be configured as a self-contained computing environment. The virtual machine may comprise an operating system, applications, data, and its own configuration. For example, a virtual machine may be implemented as a database server with a server operating system and a database. A host computing device, such as a desktop, server, or storage controller, may host one or more virtual machines. A virtual machine management console may be configured to manage one or more virtual machines. For example, the virtual machine management console may create a snapshot of an original virtual machine stored within one or more original datastores according to an original virtual machine layout. However, the original virtual machine layout of the original virtual machine may change over time to a current virtual machine layout (e.g., the original virtual machine may be stored as a current virtual machine within one or more current datastores according to a current virtual machine layout). Accordingly, it may be advantageous to restore the original virtual machine from the snapshot according to the current virtual machine layout (e.g., as opposed to the original virtual machine layout).

To provide context for restoring an original virtual machine, FIG. 1 illustrates an embodiment of a clustered network environment 100. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating an example clustered network environment 100 that may implement at least some embodiments of the techniques and/or systems described herein. It may be appreciated, however, that FIG. 1 (and FIG. 2) is merely an example, and that the instant disclosure, including the scope of the appended claims, is not meant to be limited to the same. For example, one or more techniques and/or systems described herein may be implemented within a variety of computing environments that may be configured to virtualize data, such as virtual machine data (e.g., a laptop, desktop, etc. comprising a guest operating system that may be running on a hypervisor, such as a VMware ESX/ESXi hypervisor, for example). The example environment 100 comprises data storage systems 102 and 104 that are coupled over a cluster fabric 106, such as a computing network embodied as a private Infiniband or Fibre Channel (FC) network facilitating communication between the storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more clients 108, 110 which may comprise, for example, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets. Illustratively, the clients 108, 110 may be general-purpose computers running applications, and may interact with the data storage systems 102, 104 using a client/server model for exchange of information. That is, the client may request data from the data storage system, and the data storage system may return results of the request to the client via one or more network connections 112, 114.

The nodes 116, 118 on clustered data storage systems 102, 104 can comprise network or host nodes that are interconnected as a cluster to provide data storage and management services, such as to an enterprise having remote locations, for example. Such a node in a data storage and management network cluster environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

As illustrated in the exemplary environment 100, nodes 116, 118 can comprise various functional components that coordinate to provide distributed storage architecture for the cluster. For example, the nodes can comprise a network module 120, 122 (e.g., N-Module, or N-Blade) and a data module 124, 126 (e.g., D-Module, or D-Blade). Network modules 120, 122 can be configured to allow the nodes 116, 118 to connect with clients 108, 110 over the network connections 112, 114, for example, allowing the clients 108, 110 to access data stored in the distributed storage system. Further, the network modules 120, 122 can provide connections with one or more other components through the cluster fabric 106. For example, in FIG. 1, a first network module 120 of first node 116 can access a second data storage device 130 by sending a request through a second data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to a storage area network (SAN) protocol, such as Small Computer System Interface (SCSI) or Fiber Channel Protocol (FCP), for example. Thus, as seen from an operating system on a node 116, 118, the data storage devices 128, 130 can appear as locally attached to the operating system. In this manner, different nodes 116, 118, etc. may access data blocks through the operating system, rather than expressly requesting abstract files.

It should be appreciated that, while the example embodiment 100 illustrates an equal number of N and D modules, other embodiments may comprise a differing number of these modules. For example, there may be a plurality of N and/or D modules interconnected in a cluster that does not have a one-to-one correspondence between the N and D modules. That is, different nodes can have a different number of N and D modules, and the same node can have a different number of N modules than D modules.

Further, a client 108, 110 can be networked with the nodes 116, 118 in the cluster, over the networking connections 112, 114. As an example, respective clients 108, 110 that are networked to a cluster may request services (e.g., exchanging of information in the form of data packets) of a node 116, 118 in the cluster, and the node 116, 118 can return results of the requested services to the clients 108, 110. In one embodiment, the clients 108, 110 can exchange information with the network modules 120, 122 residing in the nodes (e.g., network hosts) 116, 118 in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the example environment 100, the clients 108, 110 can utilize the data storage systems 102, 104 to store and retrieve data from the volumes 132. In this embodiment, for example, the client 108 can send data packets to the N-module 120 in the node 116 within data storage system 102. The node 116 can forward the data to the data storage device 128 using the D-module 124, where the data storage device 128 comprises volume 132A. In this way, in this example, the client can access the storage volume 132A, to store and/or retrieve data, using the data storage system 102 connected by the network connection 112. Further, in this embodiment, the client 110 can exchange data with the N-module 122 in the host 118 within the data storage system 104 (e.g., which may be remote from the data storage system 102). The host 118 can forward the data to the data storage device 130 using the D-module 126, thereby accessing volume 132B associated with the data storage device 130.

It may be appreciated that a virtual machine may be implemented within the clustered network environment 100. In one example, client 108 and/or client 110 may host a virtual machine. In another example, client 108 and/or client 110 may access a virtual machine stored within data storage device 128 (e.g., node 116 may provide access to the virtual machine) and/or a virtual machine stored within data storage device 130 (e.g., node 118 may provide access to the virtual machine). In one example, a virtual machine management console (e.g., implemented within a hypervisor, such as an ESX server) that manages and/or virtualizes virtual machines may be implemented within client 108, client 110, node 116, and/or node 118.

Figure 2:
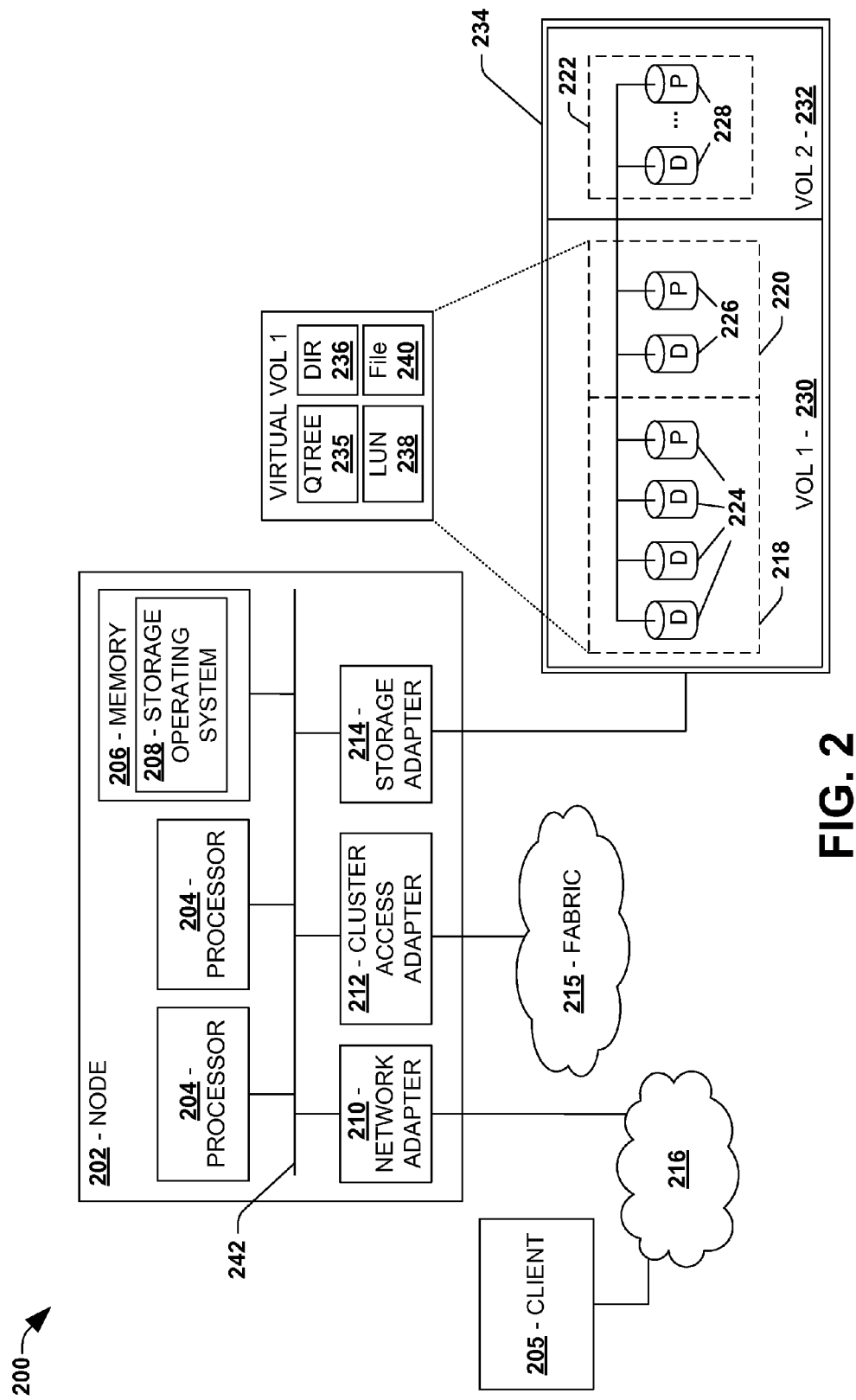
FIG. 2 is a component block diagram illustrating an example data storage system in accordance with one or more of the provisions set forth herein.

FIG. 2 is an illustrative example of a data storage system 200 (e.g., 102, 104 in FIG. 1), providing further detail of an embodiment of components that may implement one or more of the techniques and/or systems described herein. The example data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A client 205 (e.g., 108, 110 in FIG. 1) can be connected to the node 202 over a network 216, for example, to provides access to files and/or other data stored on the data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the host 202 can respond to client requests to manage data on the data storage device 200 (e.g., or additional clustered devices) in accordance with these client requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software program code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing program instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a client 205 over a computer network 216, which may comprise, among other things, a point-to-point connection or a shared medium, such as a local area network. The client 205 (e.g., 108, 110 of FIG. 1) may be a general-purpose computer configured to execute applications. As described above, the client 205 may interact with the data storage system 200 in accordance with a client/host model of information delivery.

The storage adapter 214 cooperates with the operating system 208 executing on the host 202 to access information requested by the client 205. The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the client 205 over the network connection 216 (and/or returned to another node attached to the cluster over the cluster fabric 215).

In one embodiment, storage of information on arrays 218, 220, 222 can be implemented as one or more storage "volumes" 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume, which may also be referred to as a "traditional volume" in some contexts, corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the host 202 connects to a volume 230, 232 through the storage adapter 214, a connection between the host 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the LUNs 238.

It may be appreciated that a virtual machine may be implemented within the data storage system 200. In one example, virtual machine data, such as virtual machine configuration data and/or virtual machine disk data associated with a virtual machine, may be stored within the storage device 234. Node 202 may be configured to manage the virtual machine. For example, the node 202 may host a virtual machine management console configured to virtualize the virtual machine. In this way, the virtual machine management console of node 202 may provide the client 205 with access to the virtual machine.

Figure 3:
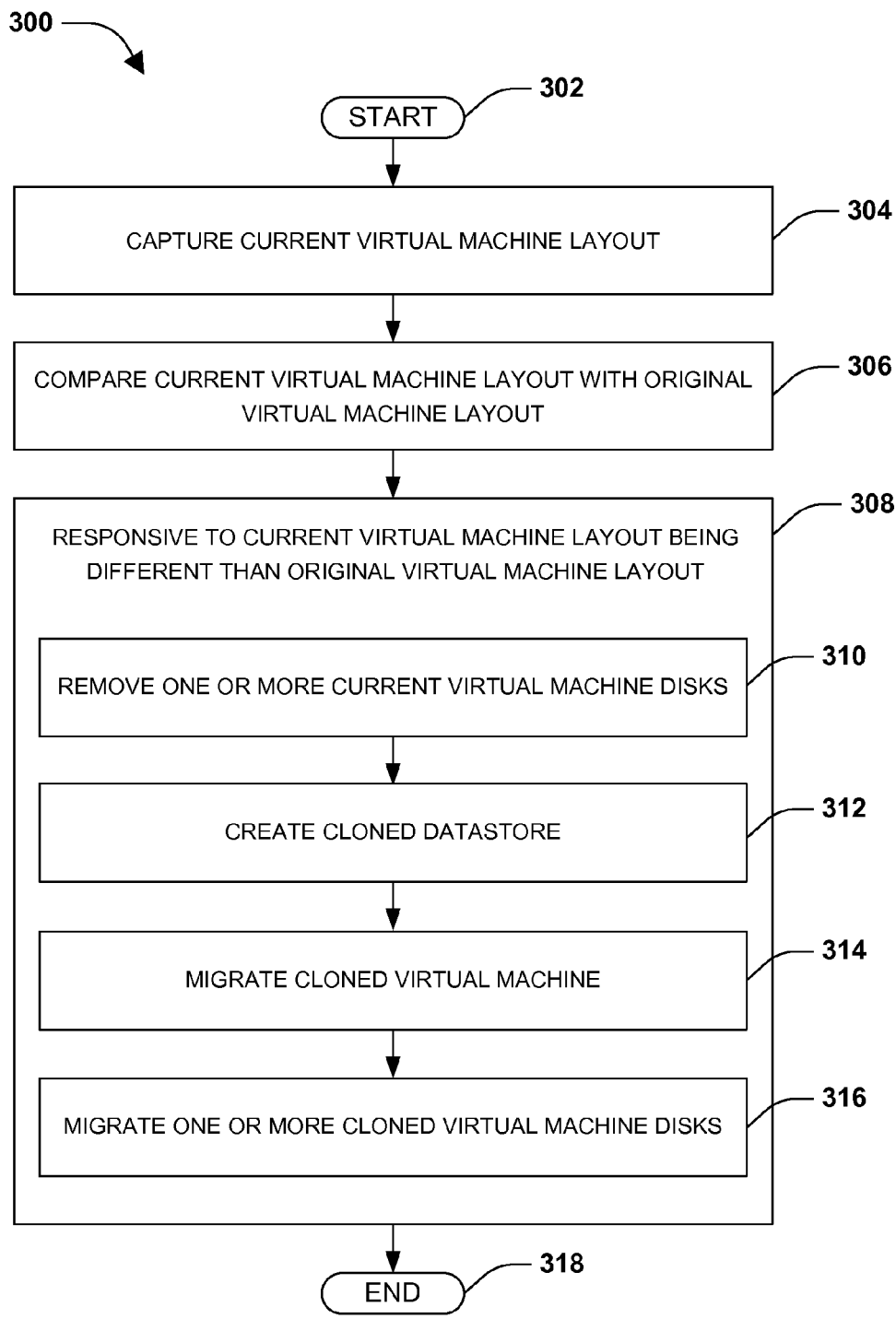
FIG. 3 is a flow chart illustrating an exemplary method of restoring an original virtual machine from a snapshot according to a current virtual machine layout different than an original virtual machine layout of the original virtual machine.
Figure 4:
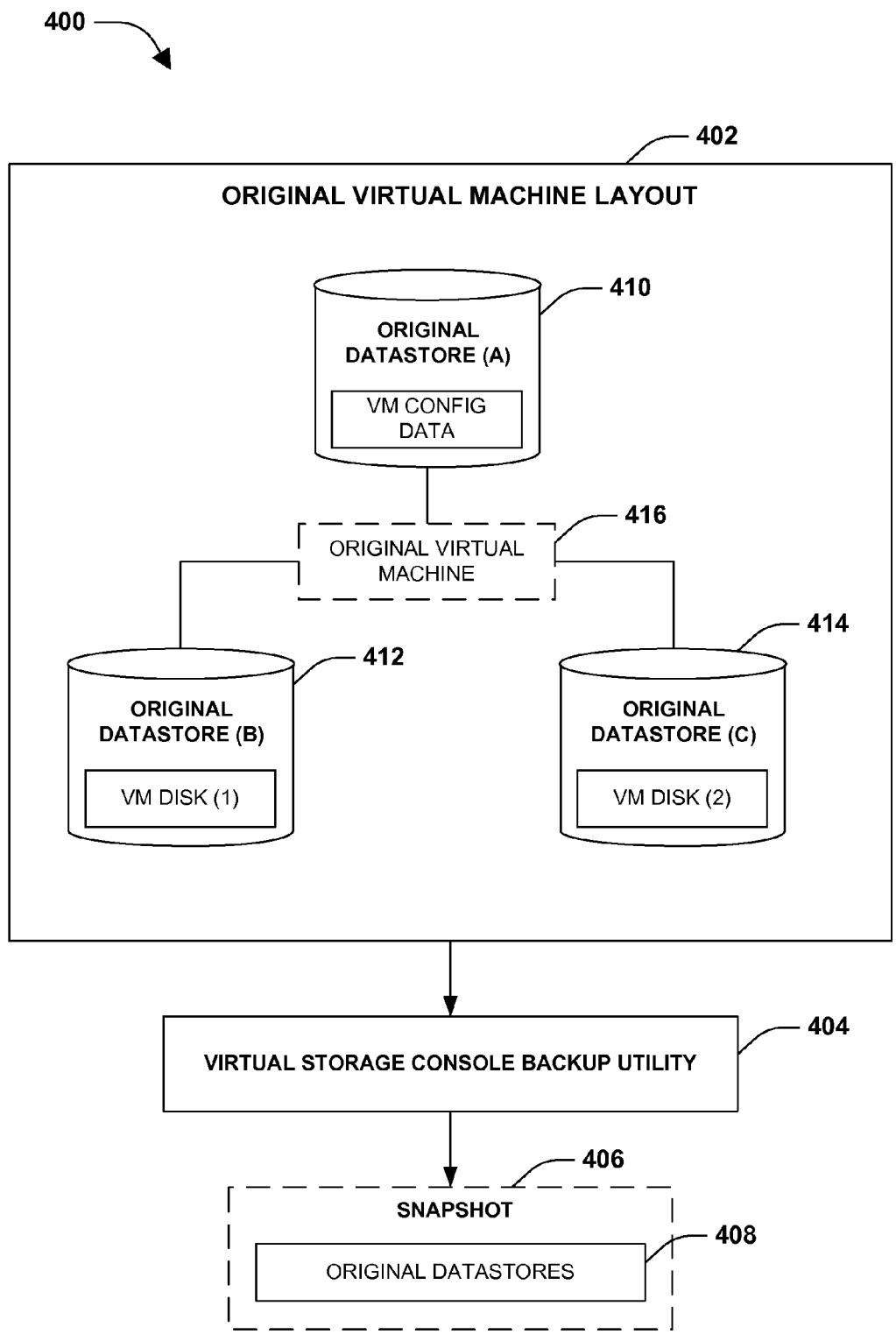
FIG. 4 is an example of a virtual storage console backup utility creating a snapshot of one or more original datastores.

One embodiment of restoring an original virtual machine from a snapshot according to a current virtual machine layout different than an original virtual machine layout of the original virtual machine is illustrated by an exemplary method 300 of FIG. 3. At 302, the method starts. An original virtual machine (e.g., a virtual machine at a first point in time) may be stored within one or more original datastores (e.g., a volume, a LUN, a folder, a storage container, a storage controller, a storage device, etc.) according to an original virtual machine layout. For example, virtual machine configuration data may be stored within an original datastore (A), a virtual machine disk (1) may be stored within an original datastore (B), and a virtual machine disk (2) may be stored within an original datastore (C). It may be appreciated that one example of an original virtual machine 416 stored according to an original virtual machine layout 402 is illustrated in FIG. 4. A snapshot of the original virtual machine may be created (e.g., a point in time representation of the virtual machine). For example, the snapshot may comprise a storage snapshot of the one or more original datastores comprising the original virtual machine. The snapshot may be used to create a cloned datastore, such as one or more cloned replicas of the one or more original datastores. The cloned datastore may comprise a cloned virtual machine (e.g., cloned virtual machine configuration data and/or cloned virtual machine disk data) corresponding to the original virtual machine stored according to the original virtual machine layout. Unfortunately, current restoration techniques may merely restore the original virtual machine as the cloned virtual machine according to the original virtual machine layout. That is, if the original virtual machine layout has changed to a current virtual machine layout (e.g., an administrator consolidated the virtual machine disk (1) and the virtual machine disk (2) into a current datastore (Y)), then current restoration techniques may be unable to restore the original virtual machine from the snapshot according to the current virtual machine layout.

Figure 5:
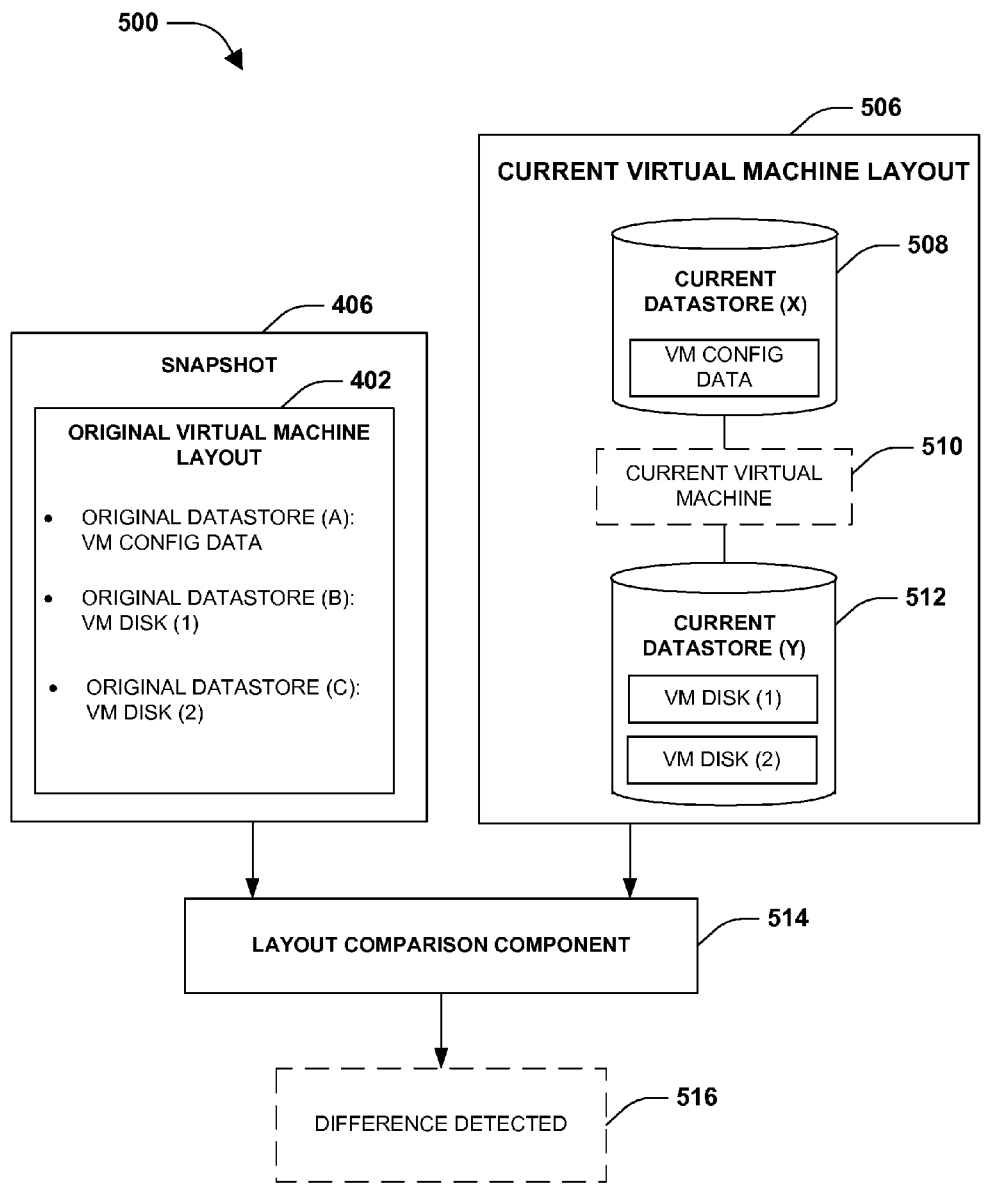
FIG. 5 is a component block diagram illustrating an exemplary system for comparing a current virtual machine layout with an original virtual machine layout.

Accordingly, as provided herein, the original virtual machine may be restored from the snapshot according to the current virtual machine layout different than the original virtual machine layout. At 304, a current virtual machine layout of a current virtual machine (e.g., a current version/instance of the original virtual machine) may be captured. That is, the original virtual machine layout may define how the original virtual machine (e.g., a virtual machine at a first point in time) was previously stored within one or more original datastores, while the current virtual machine layout may define how the current virtual machine (e.g., the virtual machine at a second point in time after the first point in time) is currently stored within one or more current datastores. It may be appreciated that one example of a current virtual machine 510 stored according to a current virtual machine layout 506 is illustrated in FIG. 5. In one example of capturing the current virtual machine layout, the current virtual machine layout may be requested from a web service of a virtual machine management console (e.g., a hypervisor management application configured to virtualize virtual machines) based upon a current ID associated with the current virtual machine. The current ID may uniquely identify the current virtual machine and/or the current virtual machine layout. The current virtual machine layout may identify one or more current datastores as comprising virtual machine configuration data for the current virtual machine and one or more current datastores as comprising virtual machine disk data for the current virtual machine, for example.

At 306, the current virtual machine layout may be compared with the original virtual machine layout to determine whether the current virtual machine layout is different than the original virtual machine layout as specified within the snapshot (e.g., whether the current virtual machine is stored differently than the manner with which the original virtual machine was previously stored when the snapshot was created). For example, the current ID associated with the current virtual machine may be compared with an original ID associated with the original virtual machine (e.g., the original ID may be specified within the snapshot, and may uniquely identify the original virtual machine and/or the original virtual machine layout). Responsive to the current ID and the original ID being different, the current virtual machine layout may be determined to be different than the original virtual machine layout. It may be appreciated that one example of comparing an original virtual machine layout 402 with a current virtual machine layout 506 is illustrated in FIG. 5.

Figure 6:
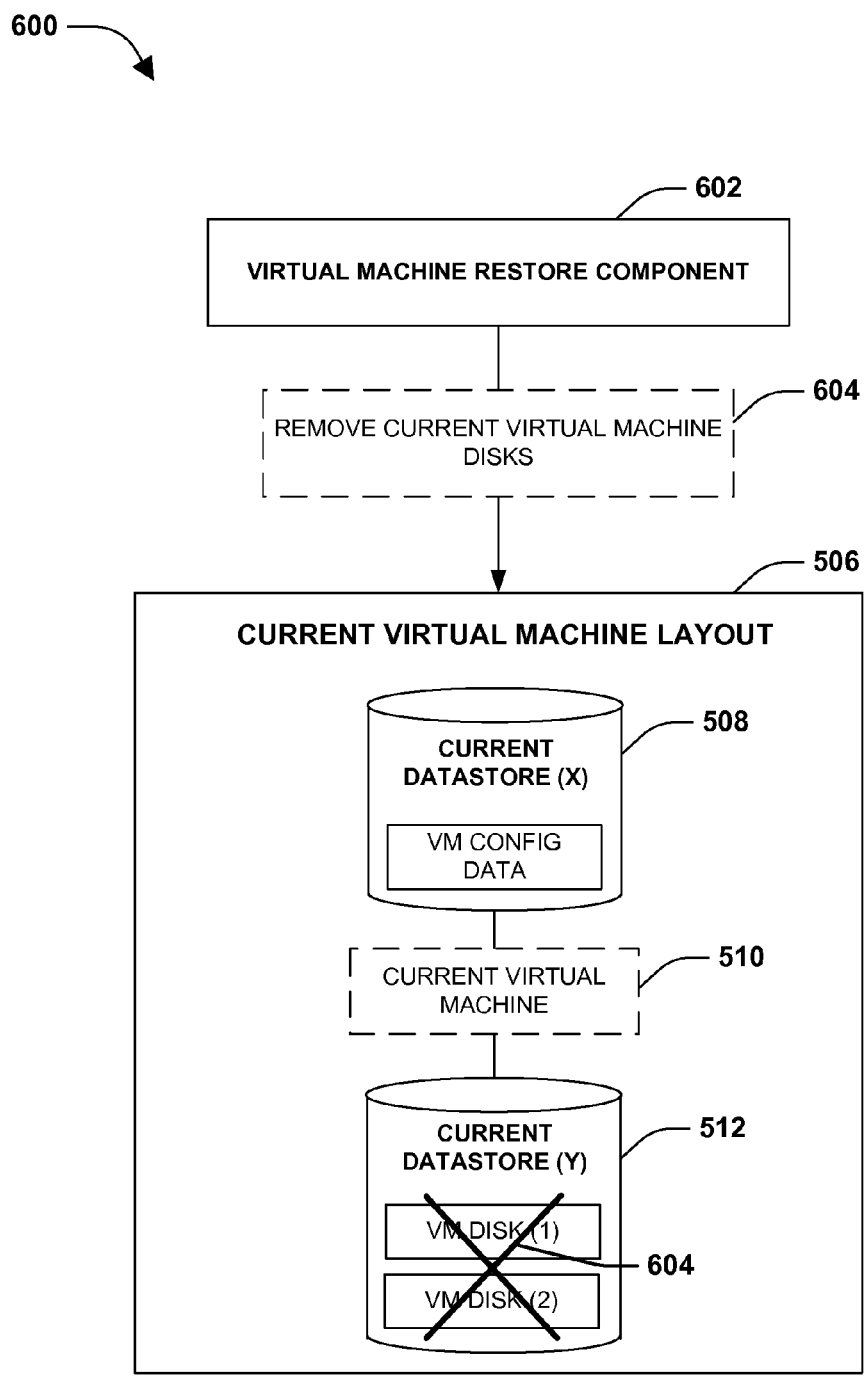
FIG. 6 is a component block diagram illustrating an exemplary system for removing one or more current virtual machine disks of a current virtual machine.

At 308, responsive to the current virtual machine layout being different than the original virtual machine layout, one or more current virtual machine disks of the current virtual machine may be removed, at 310. It may be appreciated that one example of removing 604 one or more current virtual machine disks is illustrated in FIG. 6. In one example, the current virtual machine may store virtual machine data (e.g., a guest operating system, applications, documents, and/or other virtualized data accessible through the current virtual machine) within the one or more current virtual machine disks (e.g., a storage container, such as a virtual hard disk (.VHD) file). The one or more current virtual machine disks may be detached (e.g., and/or destroyed) from the current virtual machine. For example, a detach command may be sent to the virtual machine management console, which may detach and/or destroy the one or more current virtual machine disks. In this way, storage space may be made available within the one or more current datastores, such that one or more cloned virtual machine disks may be migrated to the one or more current datastores.

Figure 7:
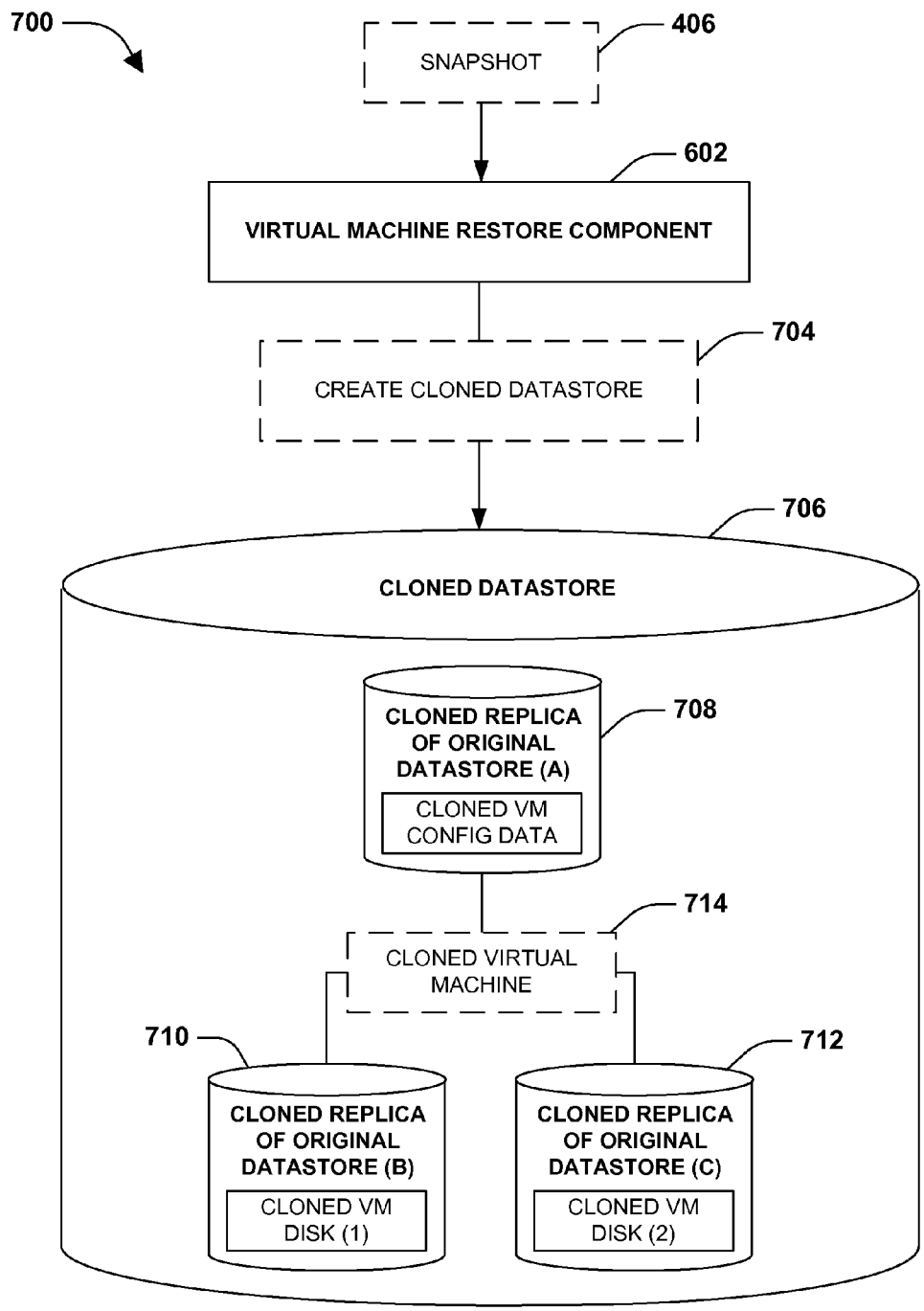
FIG. 7 is a component block diagram illustrating an exemplary system for creating a cloned datastore from a snapshot.

At 312, a cloned datastore may be created from the snapshot. The cloned datastore may correspond to the one or more original datastores (e.g., the snapshot may comprise a point in time representation of the one or more original datastores). For example, the cloned datastore may comprise cloned replicas of the one or more original datastores. The cloned datastore may comprise a cloned virtual machine (e.g., cloned virtual machine configuration data) and/or one or more cloned virtual machine disks corresponding to the original virtual machine. It may be appreciated that one example of creating 704 a cloned datastore 706 from a snapshot of one or more original datastores (e.g., original datastore (A), (B), and (C) of FIG. 4) is illustrated in FIG. 7. In one example, the cloned datastore may be mounted to a hypervisor, such as an ESX server hosting the virtual machine management console. In this way, the cloned datastore may comprise cloned replicas of the one or more original datastores, and thus may comprise a cloned virtual machine and/or one or more cloned virtual machine disks corresponding to the original virtual machine.

Figure 8:
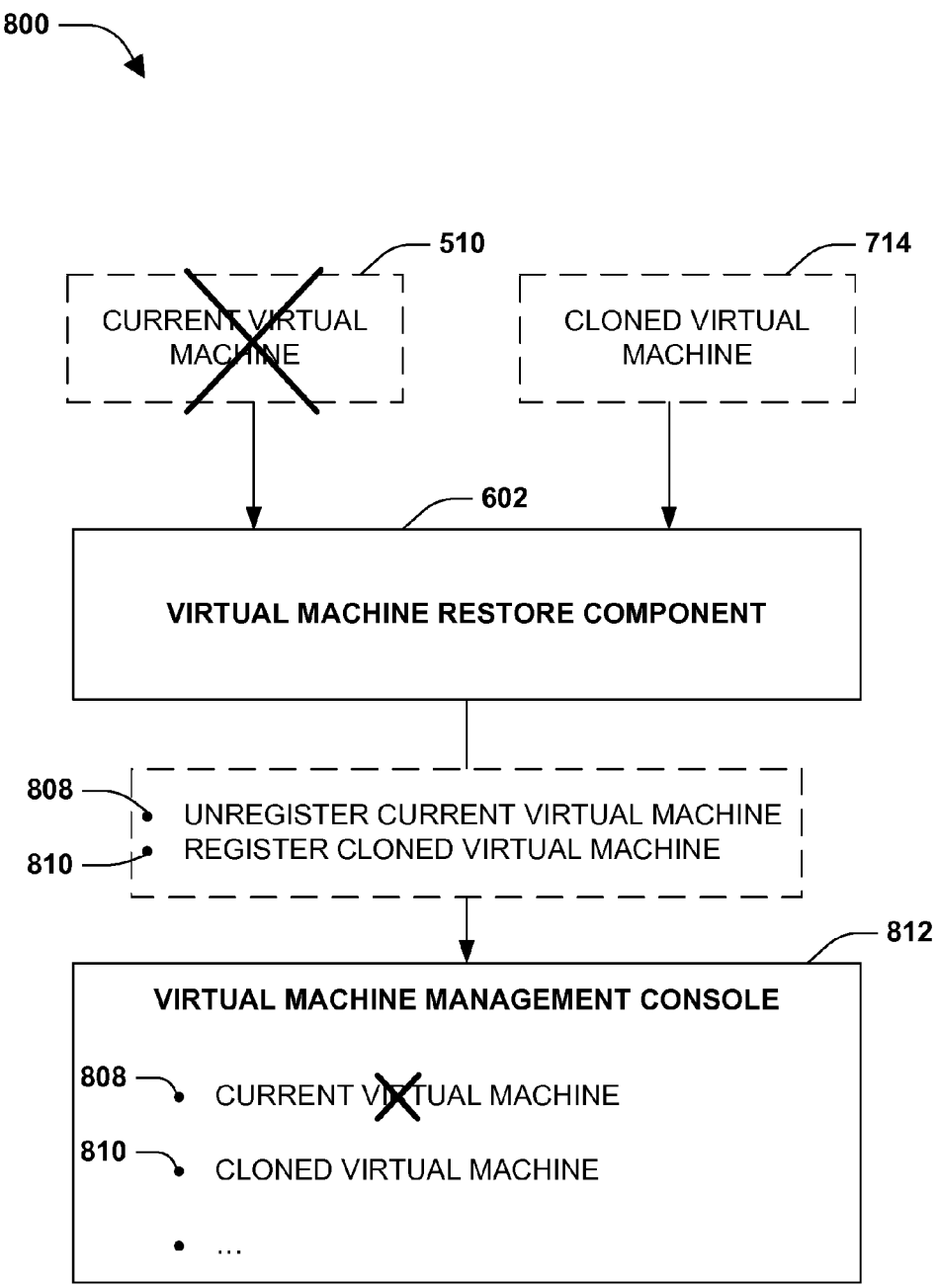
FIG. 8 is a component block diagram illustrating an exemplary system for registering a cloned virtual machine.
Figure 9:
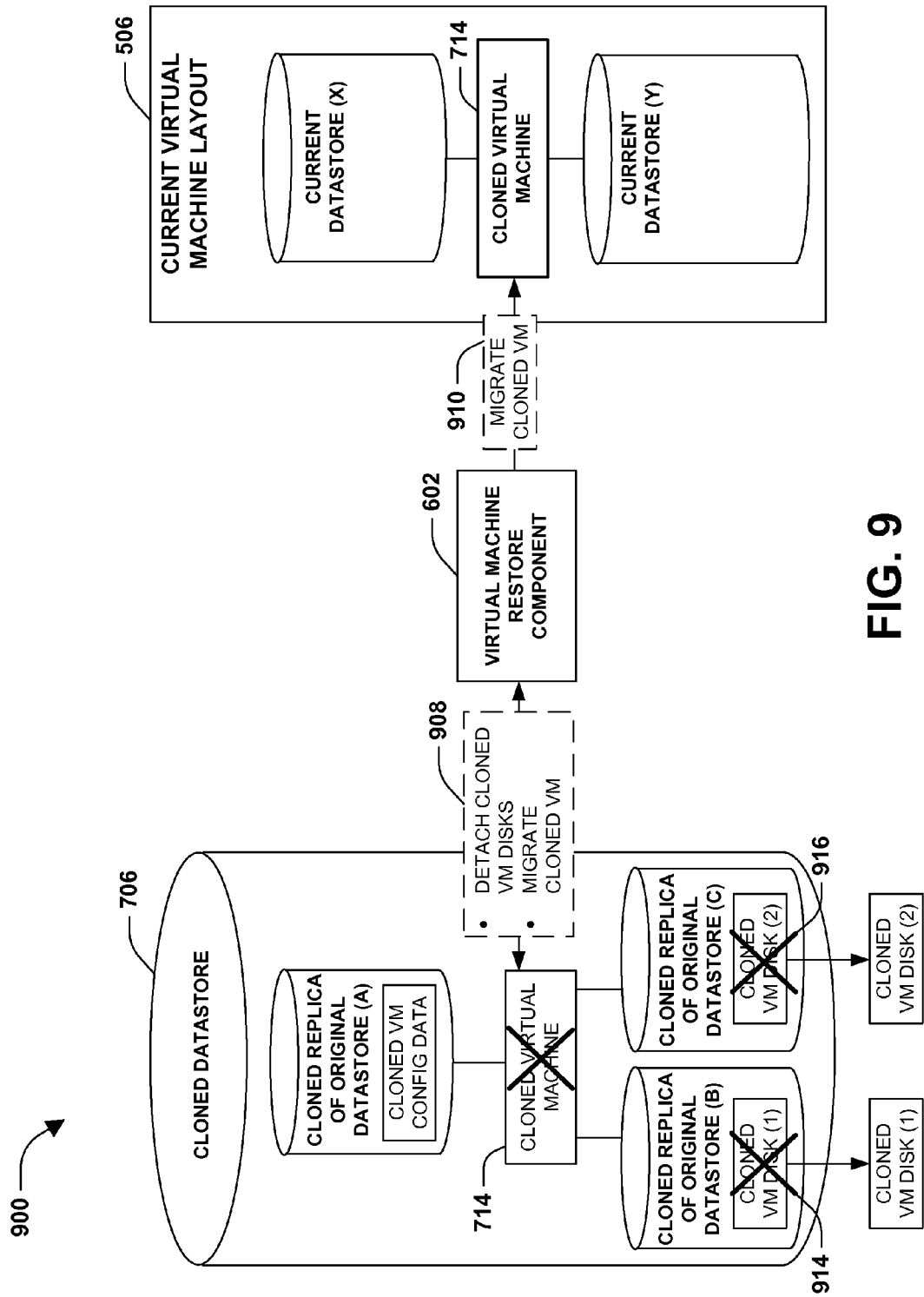
FIG. 9 is a component block diagram illustrating an exemplary system for migrating a cloned virtual machine from a cloned datastore to one or more current datastores according to a current virtual machine layout.

At 314, the cloned virtual machine within the cloned datastore may be migrated to the one or more current datastores according to the current virtual machine layout. It may be appreciated that one example of migrating 910 a cloned virtual machine 714 is illustrated in FIG. 9. In one example, the current virtual machine may be unregistered from the virtual machine management console (e.g., the virtual machine management console may remove the current virtual machine from the one or more current datastores). The one or more cloned virtual machine disks within the cloned datastore may be detached (e.g., but not destroyed) from the cloned virtual machine, and then the cloned virtual machine may be migrated to the one or more current datastores according to the current virtual machine layout. Once migrated, the cloned virtual machine may be registered with the virtual machine management console (e.g., the virtual machine management console may virtualize the cloned virtual machine from the one or more current datastores, such that a user may be provided access to the cloned virtual machine). It may be appreciated that one example of registering and/or unregistering virtual machines with a virtual machine management console 812 is illustrated in FIG. 8. In this way, the current virtual machine may be removed from the one or more current datastores, and the cloned virtual machine may be migrated from the cloned datastore to the one or more current datastores according to the current virtual machine layout.

Figure 10:
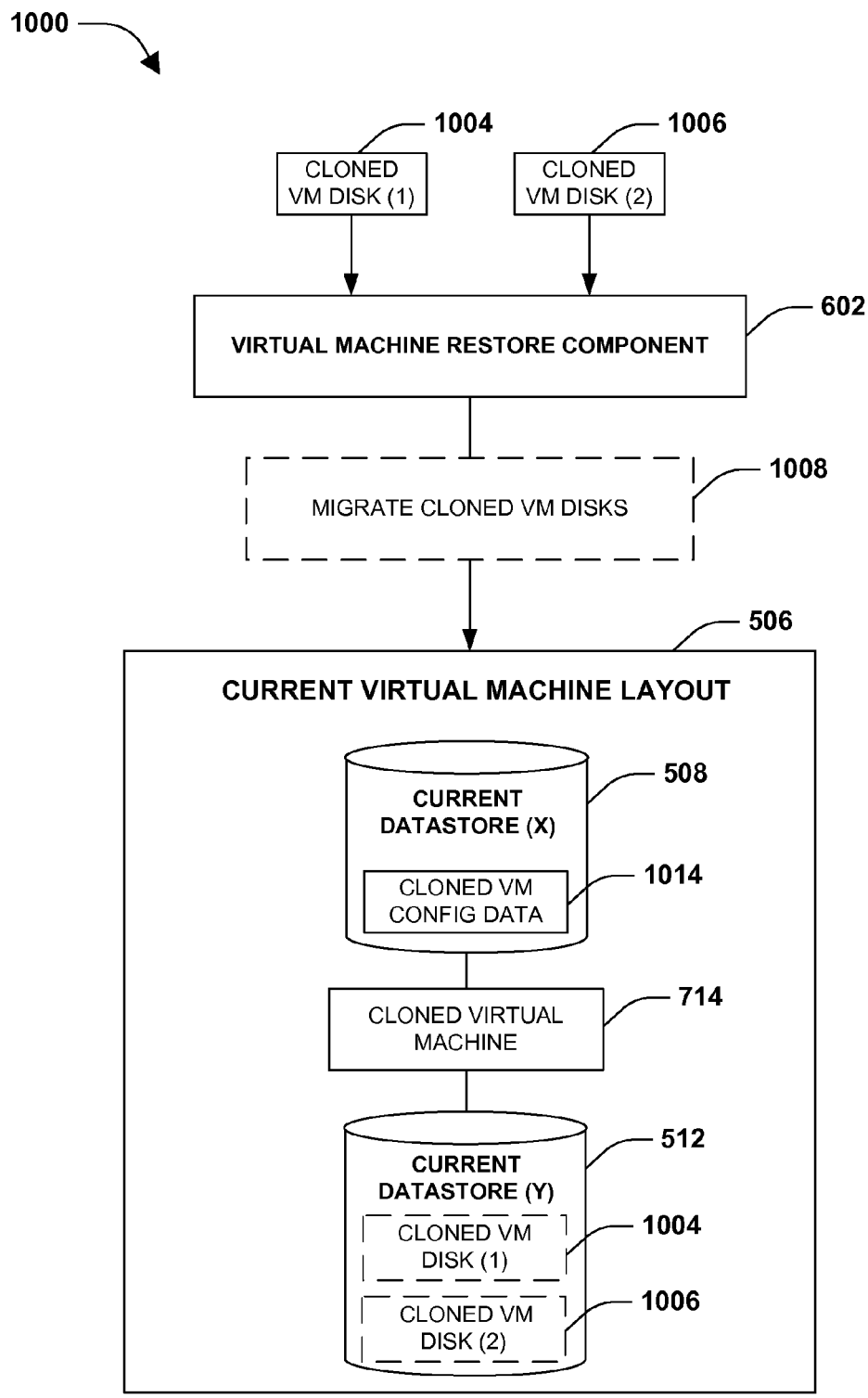
FIG. 10 is a component block diagram illustrating an exemplary system for migrating one or more cloned virtual machines disks to one or more current datastores according to a current virtual machine layout.

At 316, the one or more cloned virtual machine disks may be migrated from the cloned datastore to the one or more current datastores according to the current virtual machine layout. Once migrated, the one or more cloned virtual machine disks may be attached to the cloned virtual machine stored within the one or more current datastores according to the current virtual machine layout. It may be appreciated that one example of migrating 1008 cloned virtual machine disks is illustrated in FIG. 10. In one example, a cloned virtual machine disk may comprise a base virtual machine disk and/or a delta virtual machine disk. The base virtual machine disk may comprise a point in time representation of an original virtual machine disk at the start of a create snapshot operation (e.g., the representation may have a relatively high data consistency with the original virtual machine disk). The delta virtual machine disk may comprise changes (e.g., deltas) that may have occurred to the original virtual machine disk during the execution of the create snapshot operation. For example, a create snapshot operation may start while a user is authoring a text document. A base virtual machine disk may comprise a representation of the text document at the start of the create snapshot operation. Changes made to the text document during the create snapshot operation may be captured within a delta virtual machine disk. The delta virtual machine disk may have a relatively low data consistency with the original virtual machine disk. Accordingly, the base virtual machine disk, but not the delta virtual machine disk, may be migrated to the one or more current datastores, in one example.

Once the cloned virtual machine and/or the one or more cloned virtual machine disks are migrated to the one or more current datastores according to the current virtual machine layout, access may be provided to the cloned virtual machine. For example, the virtual machine management console may virtualize the cloned virtual machine from the one or more cloned virtual machine disks, and provide a user with access to the cloned virtual machine (e.g., the user may access a guest operating system, applications, and/or data of the cloned virtual machine). In one example, the cloned datastore may be destroyed after the migration of the cloned virtual machine and/or the one or more cloned virtual machine disks. In this way, the original virtual machine captured within the snapshot may be restored as the cloned virtual machine according to the current virtual machine layout. At 318, the method ends.

FIG. 4 illustrates an example 400 of a virtual storage console backup utility 404 creating a snapshot 406 of one or more original datastores. An original virtual machine 416 may be stored within one or more original datastores (e.g., a LUN, a volume, a folder, a storage device, etc.) according to an original virtual machine layout 402. For example, virtual machine configuration data may be stored within an original datastore (A) 410, a virtual machine disk (1) may be stored within an original datastore (B) 412, and/or a virtual machine disk (2) may be stored within an original datastore (C) 414. In this way, a virtual machine management console (e.g., hosted by a hypervisor, such as an ESX server) may be configured to virtualize the original virtual machine 416 from the original datastore (A) 410, the original datastore (B) 412, and/or the original datastore (C) 414. For example, a user may be able to interact with a guest operation system, applications, and/or data of the original virtual machine 416.

The virtual machine management console may comprise the virtual storage console backup utility 404. The virtual storage console backup utility 404 may be configured to create the snapshot 406 of the one or more original datastores as original datastores 408. In this way, the snapshot 406 may comprise a point in time representation of the original virtual machine 416, stored within the one or more original datastores according to the original virtual machine layout 402, as the original datastores 408.

FIG. 5 illustrates an example of a system 500 configured for restoring an original virtual machine from a snapshot 406. The snapshot 406 may comprise a point in time representation of one or more original datastores that stored an original virtual machine according to an original virtual machine layout 402. For example, the original virtual machine layout 402, specified within the snapshot 406, may identify an original datastore (A) as comprising virtual machine configuration data for the original virtual machine, an original datastore (B) as comprising a virtual machine disk (1) of the original virtual machine, and/or an original datastore (C) as comprising a virtual machine disk (2) of the original virtual machine. It may be appreciated that one example of creating a snapshot 406 of one or more original datastores comprising an original virtual machine stored according to an original virtual machine layout 402 is illustrated in FIG. 4.

The system 500 may comprise a layout comparison component 514. The layout comparison component 514 may be configured to capture a current virtual machine layout 506 of a current virtual machine 510. For example, the current virtual machine layout 506 may identify a current datastore (X) 508 as comprising virtual machine configuration data for the current virtual machine and a current datastore (Y) 512 as comprising a virtual machine disk (1) and a virtual machine disk (2) of the current virtual machine (e.g., a current virtual machine disk (1) and a current virtual machine disk (2)). It may be appreciated that in one example, the current virtual machine 510 may correspond to the original virtual machine captured within the snapshot 406. That is, the original virtual machine may correspond to a virtual machine at a first point in time (e.g., an administrator may have created the snapshot 406 of the virtual machine on Apr. 5, 2012 as the original virtual machine), while the current virtual machine may correspond to the virtual machine at a second point in time after the first point in time (e.g., a current instance of the virtual machine at Apr. 7, 2012).

The layout comparison component 514 may be configured to compare the current virtual machine layout 506 of the current virtual machine 510 with the original virtual machine layout 402 of the original virtual machine. In one example, the layout comparison component 514 may detect a difference 516 between the layouts based upon the virtual machine configuration data, the virtual machine disk (1), and/or the virtual machine disk (2) being stored within different datastores. In another example, the layout comparison component 514 may detect the difference 516 between the layouts based upon a determination that a current ID, uniquely identifying the current virtual machine 510, is different than an original ID, uniquely identifying the original virtual machine. In this way, responsive to the layout comparison component 514 detecting the difference 516 between the current virtual machine layout 506 and the original virtual machine layout 402, a virtual machine restore component may be configured to restore the original virtual machine according to the current virtual machine layout 506 (e.g., virtual machine restore components 602 of FIGS. 6-10).

FIG. 6 illustrates an example of a system 600 configured for restoring an original virtual machine from a snapshot. The snapshot may comprise a representation of one or more original datastores comprising the original virtual machine stored according to an original virtual machine layout (e.g., an original virtual machine layout 402 of FIG. 4). The original virtual machine may correspond to a current virtual machine 510 stored within one or more current datastores according to a current virtual machine layout 506 (e.g., the original virtual machine may represent a virtual machine at a first point in while, while the current virtual machine 510 may represent the virtual machine at a second point in time later than the first point in time). For example, a current datastore (X) 508 may comprise virtual machine configuration data for the current virtual machine 510 and a current datastore (Y) 512 may comprise a current virtual machine disk (1) and/or a current virtual machine disk (2) of the current virtual machine 510.

The system 600 may comprise a virtual machine restore component 602. The virtual machine restore component 602 may be configured to restore the original virtual machine from the snapshot according to the current virtual machine layout 506 (e.g., responsive to a layout comparison component 514 of FIG. 5 detecting a difference between a current virtual machine layout 506 and an original virtual machine layout 402). In particular, the virtual machine restore component 506 may be configured to remove 604 one or more current virtual machine disks of the current virtual machine 510, such as the current virtual machine disk (1) and/or the current virtual machine disk (2). For example, the virtual machine restore component 602 may send a request to a virtual machine management console to detach and/or destroy the current virtual machine disk (1) and/or the current virtual machine disk (2). In this way, storage space may be made available within the current datastore (Y) 512 for cloned virtual machine data that may be created from the snapshot and/or migrated to the current datastore (Y) 512 (e.g., the virtual machine restore component 602 of FIG. 7 may create a cloned datastore 706, which may comprise a cloned virtual machine 714, cloned virtual machine configuration data, and/or cloned replica datastores 708, 710, and/or 712 that may be migrated to the current datastore (X) 508 and/or the current datastore (Y) 512 according to the current virtual machine layout 506).

FIG. 7 illustrates an example of a system 700 configured for restoring an original virtual machine from a snapshot 406. The snapshot 406 may comprise a representation of one or more original datastores comprising the original virtual machine stored according to an original virtual machine layout (e.g., an original virtual machine layout 402 of FIG. 4). The system 700 may comprise a virtual machine restore component 602. The virtual machine restore component 602 may be configured to create 704 a cloned datastore 706 from the snapshot 406. It may be appreciated that a variety of storage cloning techniques may be employed to create 704 the cloned datastore 706.

The cloned datastore 706 may comprise a cloned replica of original datastore (A) 708 that may correspond to an original datastore (A) (e.g., original datastore (A) 410 of FIG. 4), a cloned replica of original datastore (B) 710 that may correspond to an original datastore (B) (e.g., original datastore (B) 412 of FIG. 4), and/or a cloned replica of original datastore (C) 712 that may correspond to an original datastore (C) (e.g., original datastore (C) 414 of FIG. 4). The cloned datastore 706 may comprise a cloned virtual machine 714 that may correspond to the original virtual machine (e.g., original virtual machine 416 of FIG. 4). For example, the cloned replica of original datastore (A) 708 may comprise cloned virtual machine configuration data, the cloned replica of original datastore (B) 710 may comprise a cloned virtual machine disk (1), and/or the cloned replica of original datastore (C) 712 may comprise a cloned virtual machine disk (2). In one example, the cloned virtual machine 714 may be mounted to a hypervisor, such as an ESX server, configured to virtualize the cloned virtual machine 714 (e.g., to provide users with access to a guest operating system, applications, and/or data within the cloned virtual machine 714). In this way, the cloned datastore 706 may comprise the cloned virtual machine 714 stored according to the original virtual machine layout. It may be appreciated that in one example the cloned virtual machine 714 and/or the cloned virtual machine disks may be migrated from the cloned datastore 706 to one or more current datastores according to a current virtual machine layout (e.g., a cloned virtual machine 714 is migrated 910 in FIG. 9, and cloned virtual machine disks 1004 and 1006 are migrated 1008 in FIG. 10).

FIG. 8 illustrates an example of a system 800 configured for restoring an original virtual machine from a snapshot. The snapshot may comprise a representation of one or more original datastores comprising the original virtual machine stored according to an original virtual machine layout (e.g., an original virtual machine layout 402 of FIG. 4). The system 800 may comprise a virtual machine restore component 602. The virtual machine restore component 602 may have created a cloned datastore comprising a cloned virtual machine 714 and/or one or more cloned virtual machine disks based upon the snapshot (e.g., cloned datastore 706 comprising cloned virtual machine 714 of FIG. 7). The cloned virtual machine 714 may have been created so that the cloned virtual machine 714 may be migrated to one or more current datastores to replace a current virtual machine 510 (e.g., the cloned virtual machine 714 may comprise a replica of the original virtual machine that is to be restored within the one or more current datastores according to a current virtual machine layout). A virtual machine management console 812 (e.g., a hypervisor application) may be configured to virtualize and/or manage virtual machines, such as the current virtual machine 510 and/or the cloned virtual machine 714.

The virtual machine restore component 602 may be configured to unregister 808 the current virtual machine 510 and/or register 810 the cloned virtual machine 714 with the virtual machine management console 812. In one example, the virtual machine restore component 602 may unregister 808 the current virtual machine 510 with the virtual machine management console 812 (e.g., because the current virtual machine 510 may be replaced by the cloned virtual machine 714 in order to restore the original virtual machine replicated by the cloned virtual machine 714). The virtual machine restore component 602 may destroy the current virtual machine 510. For example, the virtual machine restore component 602 may remove the current virtual machine 510 from one or more current datastores to create storage space for the cloned virtual machine 714, which may be migrated to the one or more current datastores according to the current virtual machine layout. In another example, the virtual machine restore component 602 may register 810 the cloned virtual machine 714 with the virtual machine management console 812. In this way, the virtual machine management console 812 may virtualize the cloned virtual machine 714 (e.g., so that a user may access a guest operating system, applications, and/or data within the cloned virtual machine 714).

FIG. 9 illustrates an example of a system 900 configured for restoring an original virtual machine from a snapshot. The system 900 may comprise a virtual machine restore component 602. The virtual machine restore component 602 may have created a cloned datastore 706 from the snapshot (e.g., virtual machine restore component 602 may have created 704 a cloned datastore 706 of FIG. 7). The cloned datastore 706 may comprise cloned replicas of one or more original datastores comprising the original virtual machine (e.g., a cloned replica of original datastore (A) may comprise cloned virtual machine configuration data, a cloned replica of original datastore (B) may comprise a cloned virtual machine disk (1), a cloned replica of original datastore (C) may comprise a cloned virtual machine disk (2)). In this way, the cloned datastore 706 may comprise a cloned virtual machine 714 that may comprise a cloned replica of the original virtual machine.

The virtual machine restore component 602 may be configured to detach one or more cloned virtual machine disks from the cloned virtual machine 714 and/or migrate the cloned virtual machine 714 to one or more current datastores according to a current virtual machine layout 506 (e.g., detach and migrate 908). It may be appreciated that in one example, the virtual machine restore component 602 may have removed a current virtual machine (e.g., a current virtual machine 510 may be unregistered 808 from a virtual machine management console 812 and/or destroyed in FIG. 8) and/or one or more current virtual machine disks (e.g., one or more current virtual machines are removed 604 from current datastore (Y) 512 in FIG. 6) in order to create storage space for the cloned virtual machine 714 and/or one or more cloned virtual machine disks.

In one example, the virtual machine restore component 602 may detach 914 the cloned virtual machine disk (1) and/or detach 916 the cloned virtual machine disk (2) from the cloned virtual machine 714. The virtual machine restore component 602 may migrate 910 the cloned virtual machine 714 to the one or more current datastores according to the current virtual machine layout 506. For example, cloned virtual machine configuration data may be migrated from the cloned replica of original datastore (A) to a current datastore (X). In this way, the cloned virtual machine 714 (e.g., comprising a replica of the original virtual machine) may be stored within the one or more current datastores according to the current virtual machine layout 506. It may be appreciated that FIG. 10 illustrates an example of migrating the cloned virtual machine disk (1) and/or the cloned virtual machine disk (2) to the one or more current datastores according to a current virtual machine layout 506.

FIG. 10 illustrates an example of a system 1000 configured for restoring an original virtual machine from a snapshot. The system 1000 may comprise a virtual machine restore component 602. The virtual machine restore component 602 may have created a cloned datastore based upon the snapshot (e.g., cloned datastore 706 of FIG. 7), and may have migrated a cloned virtual machine 714 from the cloned datastore to one or more current datastores (e.g., cloned virtual machine configuration data 1014 may have been migrated to current datastore (X) 508) according to a current virtual machine layout 506. It may be appreciated that one example of migrating 910 a cloned virtual machine 714 is illustrated in FIG. 9. The virtual machine restore component 602 may have detached a cloned virtual machine disk (1) 1004 and/or a cloned virtual machine disk (2) 1006 from the cloned virtual machine 714 (e.g., before migrating the cloned virtual machine 714 to the one or more current datastores). Accordingly, the virtual machine restore component 602 may be configured to migrate 1008 the cloned virtual machine disk (1) 1004 and/or the cloned virtual machine disk (2) 1006 to the one or more current datastores according to a current virtual machine layout 506.

In one example, the virtual machine restore component 602 may migrate 1008 the cloned virtual machine disk (1) 1004 to the current datastore (Y) 512 (e.g., to replace a current virtual machine disk (1) that was removed from the current datastore (Y) 512 by the virtual machine restore component 602 to create storage space for the cloned virtual machine disk (1) 1004). The virtual machine restore component 602 may migrate 1008 the cloned virtual machine disk (2) 1006 to the current datastore (Y) 512 (e.g., to replace a current virtual machine disk (2) that was removed from the current datastore (Y) 512 by the virtual machine restore component 602 to create space for the cloned virtual machine disk (2) 1006). In this way, the cloned virtual machine disks may be migrated to the one or more current datastores according to the current virtual machine layout 506. The cloned virtual machine disk (1) 1004 and/or the cloned virtual machine disk (2) 1006 may be attached to the cloned virtual machine 714.

Accordingly, the original virtual machine may be restored from the snapshot, as the cloned virtual machine, according to the current virtual machine layout 506, which may be different than an original virtual machine layout of the original virtual machine. That is, the cloned virtual machine 714 may comprise a cloned replica of the original virtual machine, and may be stored within the one or more current datastores according to the current virtual machine layout 506 (e.g., as opposed to the original virtual machine layout). Similarly, the cloned virtual machine disks may comprise cloned replicas of original virtual machine disks of the original virtual machine, and may be stored within the one or more current datastores according to the current virtual machine layout 506 (e.g., as opposed to the original virtual machine layout).

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data.

Figure 11:
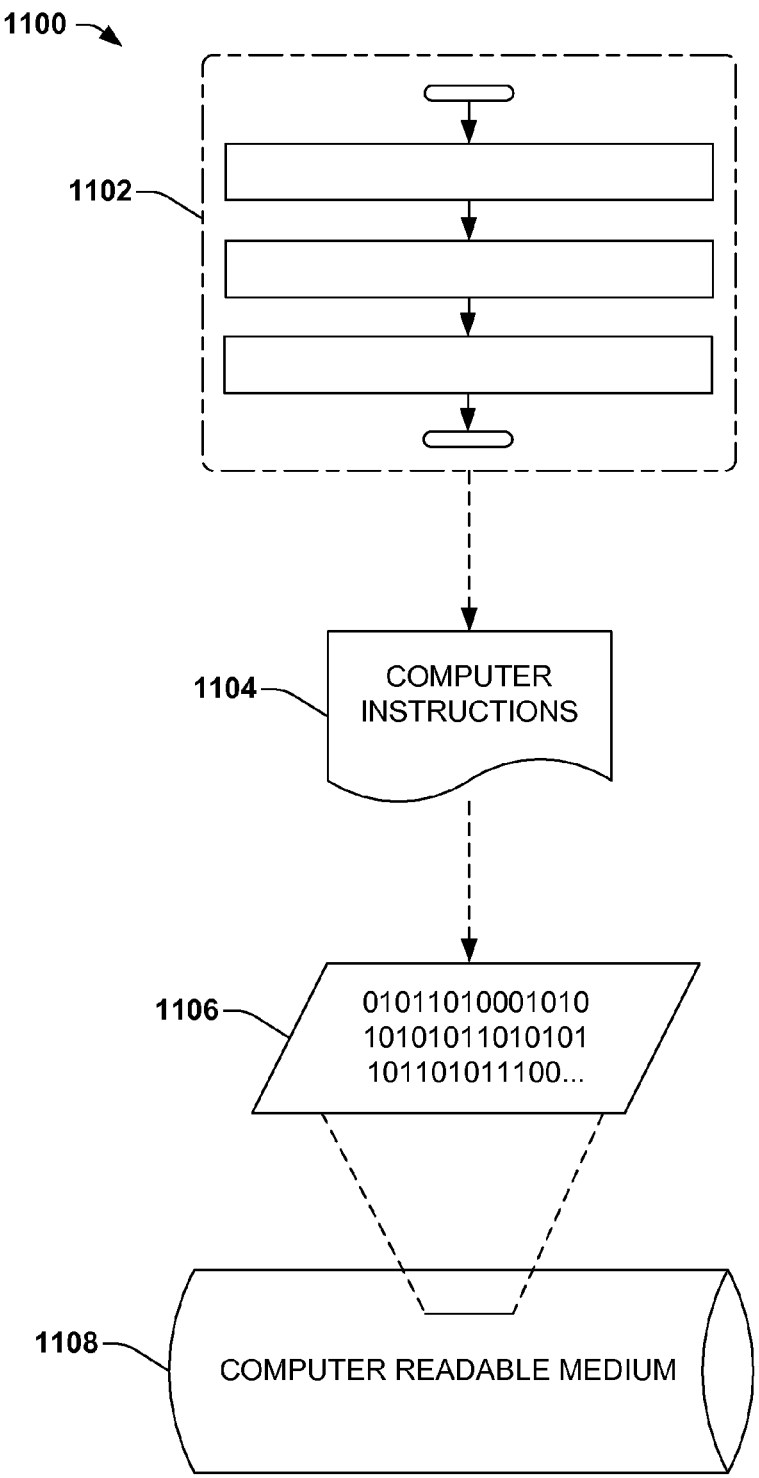
FIG. 11 is an example of a computer readable medium in accordance with one or more of the provisions set forth herein.

Another embodiment (which may include one or more of the variations described above) involves a computer-readable medium comprising processor-executable instructions configured to apply one or more of the techniques presented herein. An exemplary computer-readable medium that may be devised in these ways is illustrated in FIG. 11, where the implementation 1100 comprises a computer-readable medium 1108 (e.g., a CD-R, DVD-R, platter of a hard disk drive, flash drive, etc.), on which is encoded computer-readable data 1106. This computer-readable data 1106 in turn comprises a set of computer instructions 1104 configured to operate according to the principles set forth herein. In one such embodiment, the processor-executable instructions 1104 may be configured to perform a method 1102, such as at least some of the method 300 of FIG. 3, for example, and/or at least some of a system, such as at least some of the system 400 of FIG. 4, at least some of the system 500 of FIG. 5, at least some of system 600 of FIG. 6, at least some of system 700 of FIG. 7, at least some of system 800 of FIG. 8, at least some of system 900 of FIG. 9, and/or at least some of system 1000 of FIG. 10, for example. Many such computer-readable media may be devised by those of ordinary skill in the art that are configured to operate in accordance with the techniques presented herein.

Although the disclosure has been shown and described with respect to one or more implementations, equivalent alterations and modifications will occur to others skilled in the art based upon a reading and understanding of this specification and the annexed drawings. The disclosure is intended to include such modifications and alterations. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. Furthermore, to the extent that the terms "includes", "having", "has", "with", or variants thereof are used in either the detailed description or the claims, such terms are intended to be inclusive in a manner similar to the term "comprising." Also, "exemplary" means an example, not the best; "or" is intended to be inclusive not exclusive; "a" and/or "an" mean "one or more" unless specified otherwise and/or clear from context to be directed to a singular form; and at least one of A and B and/or the like generally means A or B or both A and B.

What is claimed is:

1. A method for restoring an original virtual machine from a snapshot according to a current virtual machine layout different than an original virtual machine layout of the original virtual machine, comprising:
    capturing a current virtual machine layout of a current virtual machine, the current virtual machine stored within one or more current datastores;
    comparing the current virtual machine layout with an original virtual machine layout, specified within a snapshot, of an original virtual machine, the original virtual machine stored within one or more original datastores when the snapshot was created; and
    responsive to the current virtual machine layout being different than the original virtual machine layout:
        removing one or more current virtual machine storage devices of the current virtual machine;
        creating a cloned datastore from the snapshot, the cloned datastore comprising a cloned virtual machine and one or more cloned virtual machine storage devices, the cloned virtual machine and the one or more cloned virtual machine storage devices corresponding to the original virtual machine;
        migrating the cloned virtual machine within the cloned datastore to the one or more current datastores according to the current virtual machine layout; and
        migrating the one or more cloned virtual machine storage devices within the cloned datastore to the one or more current datastores according to the current virtual machine layout.

2. The method of claim 1, the current virtual machine layout identifying one or more current datastores as comprising virtual machine configuration data for the current virtual machine and one or more current datastores as comprising virtual machine storage device data for the current virtual machine, the original virtual machine layout identifying one or more original datastores as comprising virtual machine configuration data for the original virtual machine and one or more original datastores as comprising virtual machine storage device data for the original virtual machine.

3. The method of claim 1, the snapshot comprising a point in time representation of the one or more original datastores.

4. The method of claim 1, the capturing a current virtual machine layout comprising:
    requesting the current virtual machine layout from a web service of a virtual machine management console based upon a current ID associated with the current virtual machine.

5. The method of claim 4, the comparing the current virtual machine layout with an original virtual machine layout comprising:
    determining whether the current ID associated with the current virtual machine is different than an original ID associated with the original virtual machine, the original ID specified within the snapshot.

6. The method of claim 1, the removing one or more current virtual machine storage devices comprising:
    detaching the one or more current virtual machine storage devices, the detaching comprising destroying the one or more current virtual machine storage devices.

7. The method of claim 1, the creating a cloned datastore, comprising:
    mounting the cloned datastore to an ESX server.

8. The method of claim 1, the migrating the cloned virtual machine comprising:
    unregistering the current virtual machine with a virtual machine management console, the unregistering comprising removing the current virtual machine; and
    registering the cloned virtual machine with the virtual machine management console.

9. The method of claim 1, the migrating the cloned virtual machine comprising:
    detaching the one or more cloned virtual machine storage devices within the cloned datastore, the detaching comprising not destroying the one or more cloned virtual machine storage devices.

10. The method of claim 1, the migrating the one or more cloned virtual machine storage devices comprising:
    attaching the one or more cloned virtual machine storage devices to the cloned virtual machine migrated to the one or more current datastores.

11. The method of claim 1, the migrating one or more cloned virtual machine storage devices comprising:
    migrating a base virtual machine storage device; and
    refraining from migrating a delta virtual machine storage device.

12. The method of claim 1, an original datastore comprising at least one of a volume and a LUN, a current datastore comprising at least one of a volume and a LUN, and the cloned datastore comprising at least one of a volume and a LUN.

13. The method of claim 1, comprising:
    destroying the cloned datastore after migrating the cloned virtual machine and after migrating the one or more cloned virtual machine storage devices.

14. The method of claim 1, comprising:
    providing access to the cloned virtual machine and the one or more cloned virtual machine storage devices stored within the one or more current datastores according to the current virtual machine layout.

15. A system for restoring an original virtual machine from a snapshot according to a current virtual machine layout different than an original virtual machine layout of the original virtual machine, comprising:
    a layout comparison component configured to:
        capture a current virtual machine layout of a current virtual machine, the current virtual machine stored within one or more current datastores; and
        compare the current virtual machine layout with an original virtual machine layout, specified within a snapshot, of an original virtual machine, the original virtual machine stored within one or more original datastores when the snapshot was created; and
    a virtual machine restore component configured to:
        responsive to the current virtual machine layout being different than the original virtual machine layout:
            remove one or more current virtual machine storage devices of the current virtual machine;
            create a cloned datastore from the snapshot, the cloned datastore comprising a cloned virtual machine and one or more cloned virtual machine storage devices, the cloned virtual machine and the one or more cloned virtual machine storage devices corresponding to the original virtual machine;
            migrate the cloned virtual machine within the cloned datastore to the one or more current datastores according to the current virtual machine layout; and
            migrate the one or more cloned virtual machine storage devices within the cloned datastore to the one or more current datastores according to the current virtual machine layout.

16. The system of claim 15, the layout comparison component configured to:
    request the current virtual machine layout from a web service of a virtual machine management console based upon a current ID associated with the current virtual machine; and
    determine whether the current ID associated with the current virtual machine is different than an original ID associated with the original virtual machine, the original ID specified within the snapshot.

17. The system of claim 15, the virtual machine restore component configured to:
    detach the one or more current virtual machine storage devices; and
    destroy the one or more current virtual machine storage devices.

18. The system of claim 15, the virtual machine restore component configured to:
    unregister the current virtual machine with a virtual machine management console, the unregistering comprising removing the current virtual machine; and
    register the cloned virtual machine with the virtual machine management console.

19. The system of claim 15, the virtual machine restore component configured to:
    detach the one or more cloned virtual machine storage devices within the cloned datastore, comprising not destroying the one or more cloned virtual machine storage devices; and
    attach the one or more cloned virtual machine storage devices to the cloned virtual machine migrated to the one or more current datastores.

20. A non-transitory computer-readable medium comprising processor-executable instructions that when executed perform a method for restoring an original virtual machine from a snapshot according to a current virtual machine layout different than an original virtual machine layout of the original virtual machine, comprising: capturing a current virtual machine layout of a current virtual machine, the current virtual machine stored within one or more current datastores; creating a cloned datastore from a snapshot of an original virtual machine stored within one or more original datastores according to an original virtual machine layout different than the current virtual machine layout, the cloned datastore comprising a cloned virtual machine corresponding to the original virtual machine; and migrating the cloned virtual machine within the cloned datastore to the one or more current datastores according to the current virtual machine layout.

* * * * *